Oct. 1, 1957 L. E. NORTON 2,808,510

APPARATUS UTILIZING ATOMIC OR MOLECULAR BEAMS

Filed Jan. 26, 1955

INVENTOR.
Lowell E. Norton
BY J. C. Whittaker
ATTORNEY 2,808,510

APPARATUS UTILIZING ATOMIC OR MOLECULAR BEAMS

Lowell E. Norton, Princeton, N. J., assignor to Radio Corporation of America, a corporation of Delaware Application January 26, 1955, Serial No. 484,253

13 Claims. (Cl. 250—36)

This invention relates to methods and apparatus for utilizing the effects of magnetic fields upon the spin-orientation or angular momentum of atomic, molecular or nuclear particles in a beam, and particularly relates to improvements upon molecular beam methods and apparatus for substantially enhancing useful signal components and for reducing noise signal factors.

Molecular and atomic beam techniques have been utilized to produce a control signal used to stabilize an oscillator at a frequency corresponding with or related to the frequency of an exciting field for the beam. However, in some prior methods and systems, difficulties are encountered because the useful signal component is but a small fraction of the total signal and is degraded by a relatively high noise component.

It is a principal object of the present invention to provide improved methods and systems in which the useful signal component produced by atomic and molecular beam techniques is of substantially enhanced value and is to substantially lesser extent degraded by noise.

Another object is to provide improved methods of and means for stabilizing or controlling the frequency of oscillations by atomic and molecular beam techniques.

A further object is to provide improved methods of and means for selecting and utilizing desired quantum energy level states of atomic and molecular energy for controlling electric energy.

In accordance with the present invention, the beam particles which are not in proper quantum energy level states to be affected by the exciting field and which would otherwise constitute a major part of the total signal and substantially contribute to noise, are removed from the beam prior to excitation so greatly to increase the relative population density in the beam of particles which are capable of energy level transitions and therefore significant in providing the desired control information.

More particularly, the beam particles in advance of the exciting field are subjected to a non-uniform magnetic field which deflects them to varying extents dependent upon their different magnetic substates. With the trajectories of the particles so modified, substantially only those in proper energy states to convey control information are selected and permitted to continue on through suitable slit structure, or equivalent, through the exciting or perturbing field and thence eventually to the detecting region.

The invention further resides in systems and apparatus having the features of novelty and utility hereinafter more fully described and claimed.

Figure 1:
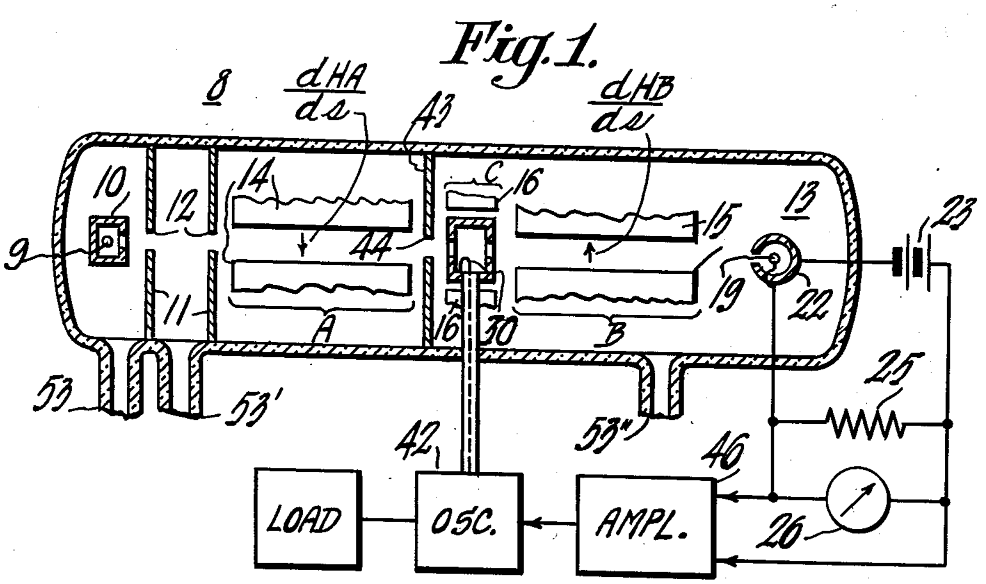
Figures 2, 3:
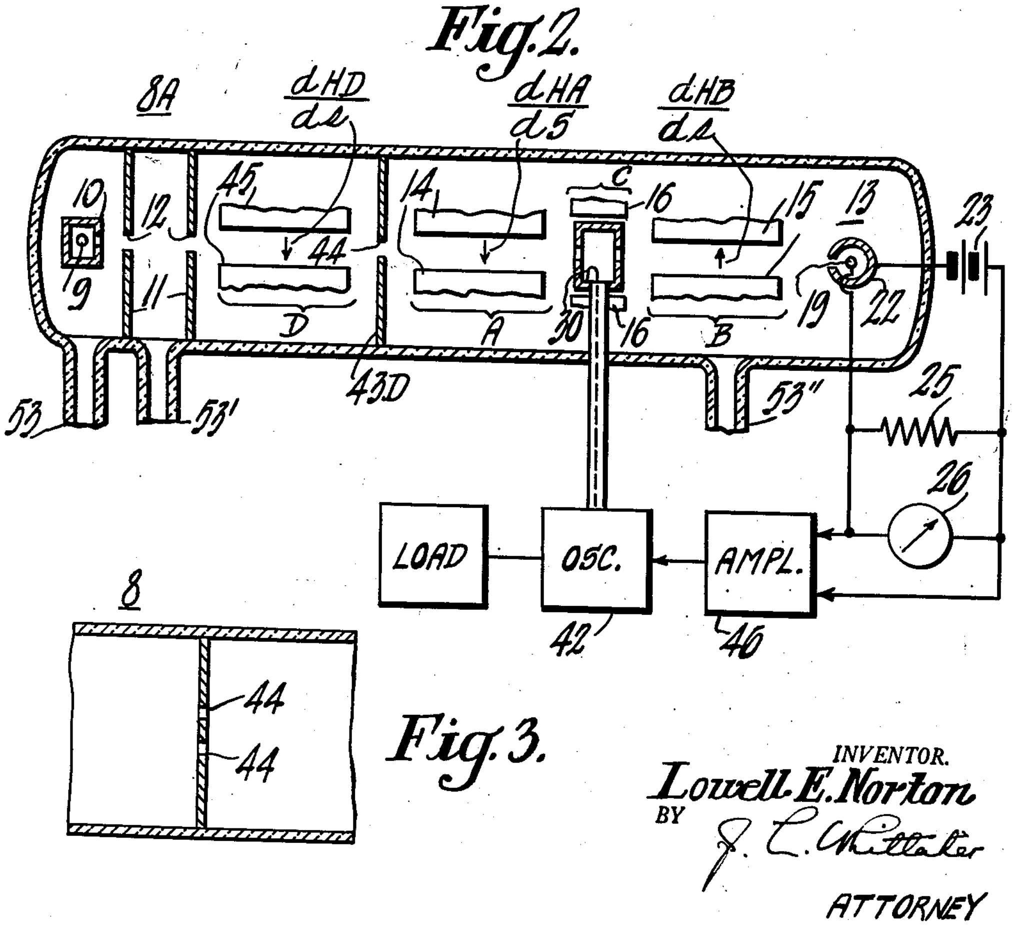

For a more detailed understanding of the invention and for illustration of preferred embodiments thereof, reference is made to the accompanying drawings in which:

Figure 1 schematically illustrates an atomic or molecular beam tube included in a frequency-stabilization system;

Figure 2 schematically illustrates a modified form of atomic or molecular beam tube; and Figure 3 schematically illustrates dual slit structure which may be utilized in the beam tubes of Figures 1 and 2.

Similar reference characters are applied to similar elements throughout the drawings.

For an understanding of basic principles of quantum mechanics here involved, reference may be had to the following papers: O. Stern—Zeit. Physich 7,249 (1921); W. Gerlach and O. Stern—Ann. Physich 74,673 (1924); G. Breit and I. I. Rabi—Phy. Rev. 38, 2082 (1931).

Referring to Figure 1, a narrow beam of atomic particles moving at thermal velocities is produced by escape of gas or vapor at low pressure from an oven 10 through a series of collimator plates 11 each having a narrow slit 12 therethrough. Since the atomic beam is formed and retains its beam characteristics only when the pressure is so low that the mean free path of the particles is large compared to the length of the beam, the pressure beyond slits 12 should be of the order of $10^{-5}$ mm. (millimeters) of mercury or less for a beam length of about 1 meter. The tube or envelope 8 enclosing the beam source 10, the collimating slits and other components later described is compartmented with connections 53, 53', and 53'' to vacuum pump equipment. The connection 53 preferably is more constricted than connections 53' and 53'' so that the oven pressure is substantially greater than $10^{-5}$ mm. of mercury, for example, 0.1 millimeter of mercury.

The oven 10 may conveniently be heated by an electrical resistor 9 and the source material may be a coating on the resistor or a sleeve surrounding it. High or low oven emitter temperatures are used depending upon the vapor pressure of the material selected for release of the beam-forming particles. For purposes of discussion here, caesium is the selected material.

The beam particles after passing through a series of magnetic fields, later described, arrive at detector 13 which preferably is a surface ionization detector. The detector 13 shown comprises a heated filament 19 of material whose work function is higher than the ionization potential of the beam particles. Specifically, filament 19 may be of tungsten whose work function is higher than the ionization potential of caesium atoms so that when the atoms in the beam strike the tungsten filament 19, heated to about 1000° C., each atom releases an electron and re-evaporates as a positive caesium ion. The positive ions so released are collected by plate 22 of the detector which is negatively charged as by battery 23 or equivalent direct-current source. The plate is provided with an entrance slot facing the beam source for passage of beam molecules or atoms 19 to the detector filament. The resulting current traversing load resistor 25 or equivalent is measurable by a sensitive measuring circuit or instrument generically represented by meter 26.

In passage from their source 10 to detector 13, the beam particles traverse two similar magnetic fields $H_A$, $H_B$ whose gradients $$\frac{dH_A}{ds} \text{ and } \frac{dH_B}{ds}$$

are of opposite direction or sense. The desired magnitude of the gradient may in each case be obtained by selection of suitable shape for the pole pieces 14, 14 and 15, 15. Suitable pole-piece constructions are disclosed in American Journal of Physics (volume 9, No. 6, page 320) and in Review of Modern Physics (volume 19, No. 3, page 330). In general, the non-uniform fields $H_A$, $H_B$ are of high intensity, as of the order of 1,000 gausses or more; they may be supplied from coils energized with direct current or by permanent magnets.

The field gradient in the first region A deflects the beam particles, the trajectory of any particular particle depending upon its energy including both its kinetic energy, due to thermal velocity, and the discrete energy of its magnetic substate. Since the field at the second region B between pole-pieces 15, 15 is the same as at region A except for reversal of the magnetic gradient, all particles of all energy classes are deflected in the reverse direction, each to the same amount as deflected in region A. The net result is as though there were no deflections and so all particles which started out in proper direction from source 10 will reach the detector 13. In effect, the beam particles from the source are focused on the detector 13 by the magnetic fields.

However, in the region C between the two non-uniform fields, the beam is subjected to a weak uniform magnetic field $H_c$ which resolves the space degeneracy of the magnetic substates of the particles and also to a time-dependent excitation field which induces transitions between certain magnetic substates of particles at different quantum energy levels. The weak magnetic field $H_C$ in region C may be either in the direction of the field $H_A$ or in the direction of field $H_B$. The weak uniform magnetic field for region C may be supplied by a permanent magnet 16, 16 or by a coil energized from a direct-current source. The time-dependent excitation field may be produced in region C by a loop or coil 30 supplied from an oscillator 42 or equivalent generator.

For the assumed case of a beam of caesium atoms, the electronic spin is $S=\frac{1}{2}$, the nuclear spin is $I=\frac{7}{2}$ and the only two possible F levels are $F=4$ and $F=3$. The magnetic substates for the $F=4$ level are $M_J=-4, -3, -2, -1, 0, +1, +2, +3, +4$: the magnetic substates for the $F=3$ level are $M_J=-3, -2, -1, 0, +1, +2, +3$. All permitted quantum states are occupied.

For nuclear splitting, the required excitation frequency of the time-dependent fields in region C is about 9192.6 megacycles for caesium. Assuming this electromagnetic excitation is quite monochromatic, transitions in both directions will be induced between only one magnetic substate of the $F=3$ level and only one magnetic substate of the $F=4$ level. The particles in this pair of levels do not experience equal and opposite deflections in the A and B regions and consequently their trajectories toward the detector 13 are affected.

The beam system as thus far described is similar to prior arrangements and has the following limitation. The useful signal component, containing information concerning deviation of the applied excitation frequency from the nuclear splitting frequency peculiar to the selected source material, comes only from those atoms which are in two of the permitted total number of magnetic substates. Since the energy levels of all the magnetic substates are nearly alike, and since the state populations are also nearly equal, the useful signal comes only from a relatively small fraction of the total number of beam particles. Most of the particles do not have energy transitions induced by the excitation field and therefore experience equal and opposite deflections in regions A, B and so contribute nothing to the useful signal. The non-useful particles constitute the major population of the beam and therefore the major component of the detector output current: such non-useful particles, because of their scattering, are also responsible for a substantial noise component of the total signal.

In accordance with the present invention, substantially only those particles which are in the proper magnetic substates for transitions when subjected to the exciting field are permitted to pass into the exciting region C. In consequence, the beam population from the exciting zone C and through the second deflecting region B to the region adjacent detector 13 consists substantially entirely of particles in states which execute energy transitions induced by the electromagnetic excitation field and whose deflections by field B are not equal and opposite to their prior deflections in region A. As a result, the useful signal component is a substantially larger fraction of the total detector output and the noise component of the signal is greatly reduced. Moreover, the atomic particle density in the C region can now be increased to substantially what the total density of all atoms was in prior arrangements, to place the same upper limit on scattering, but now the number of transitions induced by the exciting field C, and therefore the useful output signal, is very substantially increased.

Two exemplary arrangements for excluding particles which are incapable of contributing to the useful signal are specifically shown in Figures 1 and 2. In Figure 1, a slit or shutter member 43 is interposed between the first deflection region A and the exciting region C. If the particular selected magnetic substates are adjacent, the member 43 will have a single slit 44 so positioned that only the particles in such substates will have the proper trajectory after deflection in field A to pass through this slit. Particles in the other substates are so differently deflected by the field $H_A$ that they strike the solid or barrier portion of member 43 and so cannot reach the exciting region C or the detector. If the particular selected magnetic substates are not adjacent, the member 43 will have two slits spaced to pass only the particles in the selected substates. This dual type of slit structure is illustrated in Figure 3. Each half of the double slit passes only atoms of a corresponding one of the two selected levels.

In this modification (Figure 1) the magnetic field A serves two functions. It cooperates with the slit or shutter structure for removal from the beam of atoms incapable of contributing to the useful signal as well as serving as one of the two focusing fields.

In the modification shown in Figure 2, the selection of beam particles in the two energy states suited for contribution to the useful signal is effected by a third non-uniform field $H_D$, produced in region D nearer the beam source, in cooperation with a slit or shutter member 43D interposed between regions D and A. Because of the different deflections experienced in field $H_D$ by particles in the different energy levels, only those in the two selected states will pass through the slit structure to the region A. The remainder of the particles are intercepted by the solid or barrier portion of slit structure 43D. Again, as in Figure 1, if the selected magnetic substates are not adjacent, a dual rather than a single slit is provided (see Figure 3) and as before each half of the double slit passes a corresponding one of the two selected energy state atoms.

Non-uniformity of the magnetic field in region D is effected by suitable shaping of the pole-pieces 45, 45 as previously described in connection with pole-pieces 14, 15 and 15, 15. The direction of the magnetic gradient $$\frac{dH_D}{ds}$$

may be the same as, or the reverse of, that of the gradient in the next field A. The proper location of the slit in member 43D of course depends upon which gradient direction is selected for field $H_D$.

In this modification (Figure 2) the population of the beam in both of the focusing fields A, B and in the exciting field C consists substantially entirely of particles capable of energy level transitions as they move through the exciting field toward the detector. Consequently, substantially all of the particles beyond slit structure 43D are capable of performing transitions between energy levels induced by the electromagnetic excitation field and contributing to the useful signal as they pass through field regions A and B. Again as in Figure 1, with only selected atoms in the beam in the C region, the beam density can be increased to the same upper limit as for the mixture of atoms of all energy states in prior arrangements, with the significant difference however, that now substantially all of the beam particles are capable of transitions and so contribute to the useful signal component of the detector output.

The outputs of the detectors of Figures 1 and 2 may be used in any of various ways, pe se known, as signals for controlling the frequency of the exciting field in region C. In the simple arrangement shown by way of example, the control signal produced across resistor 25 is amplified by a D. C. amplifier 46 and applied to control the frequency of the exciting source 42. When the source 42 is a klystron, a grid-controlled magnetron or other microwave oscillator tube, the signal may be applied to vary the bias of a control electrode of the oscillator tube: when the source comprises a lower frequency oscillator followed by frequency-multipliers, the control voltage may be applied to a reactance tube controlling the oscillator frequency.

What is claimed is:

1. A particle beam tube comprising a beam source, a detector, means for providing at least two non-uniform magnetic field means between the beam source and the detector, means for providing an exciting-field means between two of the non-uniform field means, and means for effecting in advance of the exciting-field means substantial exclusion from the beam of particles other than those capable of energy level transitions when perturbed by the exciting field.

2. A system for producing an electrical signal comprising, means for generating a beam of particles moving in a predetermined direction at thermal velocities, means for impressing a first non-uniform magnetic field on said beam having a given field gradient to effect deflection of beam particles in all energy levels, means for selecting particles of two particular energy levels to the exclusion of particles of all other energy levels, means for impressing a field on said selected particles to induce transitions between magnetic substates of said two energy levels, means for impressing a second non-uniform magnetic field on said selected particles having a field gradient equal to and opposite in sense to the field gradient of said first field to effect deflection thereof, and means for collecting a portion of the particles deflected by said third magnetic field to produce an electrical signal.

3. A system as claimed in claim 2 wherein said field for inducing transitions comprises the combination of a uniform magnetic field and a time-dependent field.

4. A system for producing a frequency-standard control signal having a low noise component which comprises means for producing at a source a beam of neutral particles moving at thermal velocities toward a detector, means for subjecting the beam at spaced regions to first and second non-uniform magnetic fields having reversed gradients to effect equal and opposite deflections of beam particles of all unperturbed energy classes, means disposed in a region intermediate said spaced regions for subjecting the beam to an alternating exciting field to induce transitions between magnetic substates of particles of two particular energy levels whereby such particles are unequally deflected by said magnetic fields and so tend to miss said detector, and means located at a region in advance of said intermediate region for precluding further movement toward the detector of particles having energy levels other than said two particular energy levels.

5. A system as in claim 4 in which the last-named particles are blocked from further movement toward the detector in a region between said first magnetic field and said exciting field.

6. A system as in claim 4 in which the last-named particles are blocked from further movement toward the detector in a region between the beam source and said first magnetic field.

7. A system as in claim 4 which includes a third non-uniform magnetic field between said source and said first non-uniform field, and in which the last-named particles are blocked from further movement toward the detector in a region between said third and first magnetic fields.

8. A system as in claim 4 in which said control signal is applied to stabilize the frequency of said alternating exciting field.

9. A particle beam tube comprising a detector, a source for producing a beam of neutral particles moving at thermal velocities toward said detector, at least two focusing magnets spaced along the beam, exciting means between two of said magnets for producing an alternating field inducing transitions between magnetic substates of beam particles having two particular different energy levels, and slit structure between said source and said exciting means for selectively passing beam particles having said different energy levels.

10. A beam tube as in claim 9 in which said slit structure is interposed between said exciting means and the focusing magnet nearer to said beam source.

11. A beam tube as in claim 9 in which at least two focusing magnets are disposed between said exciting means and the beam source and in which the slit structure is between two of said last-named focusing magnets.

12. A system including the tube of claim 7 and in which the output of said detector is applied to control the frequency of the field produced by said exciting means.

13. Apparatus for controlling the frequency of an oscillator comprising, means for generating a beam of particles moving in a predetermined direction at thermal velocities, means for impressing a first non-uniform magnetic field having a given field gradient on said beam to effect deflection of beam particles in all energy levels, means for selecting particles of two particular energy levels to the exclusion of particles of all other energy levels, means including an oscillator having a frequency control electrode for impressing a second field on said selected particles to induce transitions between magnetic substates of said two energy levels, means for impressing a third magnetic field on said selected particles, non-uniform and having a field gradient equal to and opposite in sense to the field gradient of said first field to effect deflection thereof, means for collecting a portion of the particles deflected by said third magnetic field to produce an electrical signal, and means for applying said electrical signal to said oscillator frequency control electrode.

References Cited in the file of this patent

UNITED STATES PATENTS 2,712,069 Goldstein _____________ June 28, 1955

OTHER REFERENCES

Nuclear Resonance Spectrometer by Leonard Malling, Electronics, April 1953, pp. 184 through 187.